(12) United States Patent
Palmatier et al.

(10) Patent No.: US 6,792,630 B1
(45) Date of Patent: Sep. 21, 2004

(54) FIFTH WHEEL ASSEMBLY FOR BED

(75) Inventors: Stanley T. Palmatier, Paw Paw, MI (US); Jeffrey C. Shiery, East Leroy, MI (US); Michael J. Petrowski, Vicksburg, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 10/659,807

(22) Filed: Sep. 11, 2003

(51) Int. Cl.[7] .................................................. A61G 1/02
(52) U.S. Cl. ........................ 5/86.1; 5/600; 280/43.17; 296/20
(58) Field of Search ............................. 5/86.1, 81.1 R, 5/600; 280/47.16, 43, 43.17; 296/20

(56) References Cited

U.S. PATENT DOCUMENTS

| | | | | |
|---|---|---|---|---|
| 2,563,919 A | * | 9/1951 | Christensen | 280/43.18 |
| 2,935,331 A | * | 5/1960 | Ledgerwood | 280/79.3 |
| 3,304,116 A | | 2/1967 | Stryker | 296/20 |
| 4,164,355 A | * | 8/1979 | Eaton et al. | 296/20 |
| 4,763,910 A | | 8/1988 | Brändli et al. | 280/29 |
| 5,279,010 A | * | 1/1994 | Ferrand et al. | 5/600 |
| 5,348,326 A | | 9/1994 | Fullenkamp et al. | 280/43.17 |
| 5,802,640 A | * | 9/1998 | Ferrand et al. | 5/617 |
| 5,806,111 A | * | 9/1998 | Heimbrock et al. | 5/86.1 |
| 5,906,016 A | * | 5/1999 | Ferrand et al. | 5/600 |
| 5,906,017 A | * | 5/1999 | Ferrand et al. | 5/617 |
| 5,987,671 A | | 11/1999 | Heimbrock et al. | 5/600 |

(List continued on next page.)

FOREIGN PATENT DOCUMENTS

DE          43 19 516          12/1994

OTHER PUBLICATIONS

Stryker Model 1001, stretcher having a fifth wheel (7 photographs—A through G), Aug., 1994.

(List continued on next page.)

*Primary Examiner*—Robert G. Santos
(74) *Attorney, Agent, or Firm*—Flynn, Thiel, Boutell & Tanis, P.C.

(57) ABSTRACT

A wheeled carriage for supporting a patient includes a patient support with head and foot ends and a wheeled base supported by castered wheels. An auxiliary wheel assembly is secured to the wheeled base and includes a rotatable support shaft with an axis and a drive pin locked in a keyed surface of the support shaft. A wheel stowing spring is located at an end of the rotatable support shaft to continually urge an auxiliary wheel mounted at one end of an auxiliary wheel support bracket to a stowed position. The auxiliary wheel support bracket is rotatably connected to the support shaft at an opposing end and has a stop mounted thereon. An auxiliary wheel support spring continually urges the auxiliary wheel support bracket in a first direction about the axis of the support shaft so that the stop on the auxiliary wheel support bracket engages a stop element integral with the drive pin. This arrangement maintains the support spring in a pretensioned state. A cam apparatus rotates the support shaft in the first direction against the force of the wheel stowing spring to deploy the auxiliary wheel. In the deployed position, the mass of the wheeled carriage applies a force against the auxiliary wheel support spring that separates the stop from the stop element and pivots the auxiliary wheel support bracket about the axis of the support shaft to maintain the castered wheels and the auxiliary wheel in contact with the floor surface.

19 Claims, 5 Drawing Sheets

U.S. PATENT DOCUMENTS

| | | | | |
|---|---|---|---|---|
| 6,016,580 | A | * | 1/2000 | Heimbrock et al. ........... 5/86.1 |
| 6,230,343 | B1 | * | 5/2001 | Buiskool et al. ................ 5/610 |
| 6,240,579 | B1 | | 6/2001 | Hanson et al. ................. 5/86.1 |
| 6,256,812 | B1 | | 7/2001 | Bartow et al. ................. 5/86.1 |
| 6,264,006 | B1 | * | 7/2001 | Hanson et al. ............. 188/1.12 |
| 6,286,165 | B1 | | 9/2001 | Heimbrock et al. ........... 5/600 |
| 6,330,926 | B1 | * | 12/2001 | Heimbrock et al. ....... 180/65.5 |
| 6,401,278 | B1 | * | 6/2002 | Hayes et al. .................... 5/600 |
| 6,421,854 | B1 | * | 7/2002 | Heimbrock .................... 5/610 |
| 6,438,776 | B2 | * | 8/2002 | Ferrand et al. ................. 5/600 |
| 6,505,359 | B2 | * | 1/2003 | Heimbrock et al. ........... 5/86.1 |
| 6,598,247 | B1 | * | 7/2003 | Heimbrock et al. ........... 5/86.1 |
| 2001/0029628 | A1 | * | 10/2001 | Ferrand et al. ................. 5/600 |
| 2001/0039679 | A1 | * | 11/2001 | Heimbrock et al. ........... 5/86.1 |
| 2003/0159861 | A1 | | 8/2003 | Hopper et al. ................ 180/22 |

OTHER PUBLICATIONS

U.S. patent application No. 09/489 584, filed Jan. 21, 2000 Inventors: Keith Waters, Dennis Reed, Mark Friedman, Craig Mulder and Steve Nichols.

* cited by examiner

US 6,792,630 B1

FIFTH WHEEL ASSEMBLY FOR BED

FIELD OF THE INVENTION

This invention relates to a wheeled carriage for supporting a patient in a substantially horizontal position and, more particularly, to an auxiliary wheel arrangement for facilitating the raising of an auxiliary wheel away from a floor surface and the lowering of the auxiliary wheel onto the floor surface to assist the castered wheels in moving of the carriage.

BACKGROUND OF THE INVENTION

Wheeled carriages for supporting a patient in a substantially horizontal position are well known in the art and a representative example of an early version of such a device is illustrated in Dr. Homer H. Stryker's U.S. Pat. No. 3,304,116, reference to which is incorporated herein. Other of such wheeled carriages are disclosed in U.S. Pat. No. 6,256,812, U.S. patent application Ser. No. 09/489,584 filed Jan. 21, 2000 and U.S. patent application Ser. No. 10/083,234 filed Feb. 26, 2002, all of which are presently owned by the Assignee of record for this invention, and incorporated by reference herein.

U.S. Pat. No. 5,987,671 discloses a stretcher having a retractable auxiliary wheel that is biased into contact with a floor surface by a spring.

U.S. Pat. No. 5,348,326 discloses a carrier with deployable center wheels that are maintained in a retracted position by a spring.

One object of the invention is to provide an auxiliary wheel support bracket that is spring biased by a first spring to pivot about the axis of a shaft into a stowed position, and when deployed, separately spring biased by a second spring and pivotable about the same axis to maintain contact with a floor surface.

Another object of the invention is to provide an auxiliary wheel support bracket, as aforesaid, wherein the first and second springs are in alignment about the axis of the shaft with one spring being located adjacent one end of the shaft.

SUMMARY OF THE INVENTION

The objects and purposes of the invention are met by a wheeled carriage for supporting a patient in a substantially horizontal position, which has thereon a patient support having a head end and a foot end and a pair of lateral sides intermediate the head and foot ends, and a wheeled base having a length and supporting the patient support and enabling movement of the patient support. The wheeled base includes at least four floor surface engaging and castered wheels spaced from one another. An auxiliary wheel assembly is secured to said wheeled base and includes a rotatable support shaft with an axis and a stop element mounted to the rotatable support shaft. An auxiliary wheel support bracket has a first end rotatably secured to the support shaft to enable free rotation about the axis thereof and has a stop mounted thereon. An auxiliary wheel support spring continually urges the auxiliary wheel bracket in a first direction about the axis of the support shaft and the stop into engagement with the stop element. An auxiliary wheel is rotatably secured to a second end of the auxiliary wheel support bracket. A deployment apparatus rotates the support shaft and the stop element in the first direction about its axis to move the auxiliary wheel between a stowed position spaced from the floor and a deployed position engaging the floor. In the deployed position, the auxiliary wheel contacts a floor surface and the mass of the wheeled carriage is applied against the auxiliary wheel support spring to separate the stop from the stop element and pivot the auxiliary wheel support bracket about the axis of the support shaft so that each of the castered wheels and the auxiliary wheel maintain contact with the floor surface.

DETAILED DESCRIPTION

Figure 1:
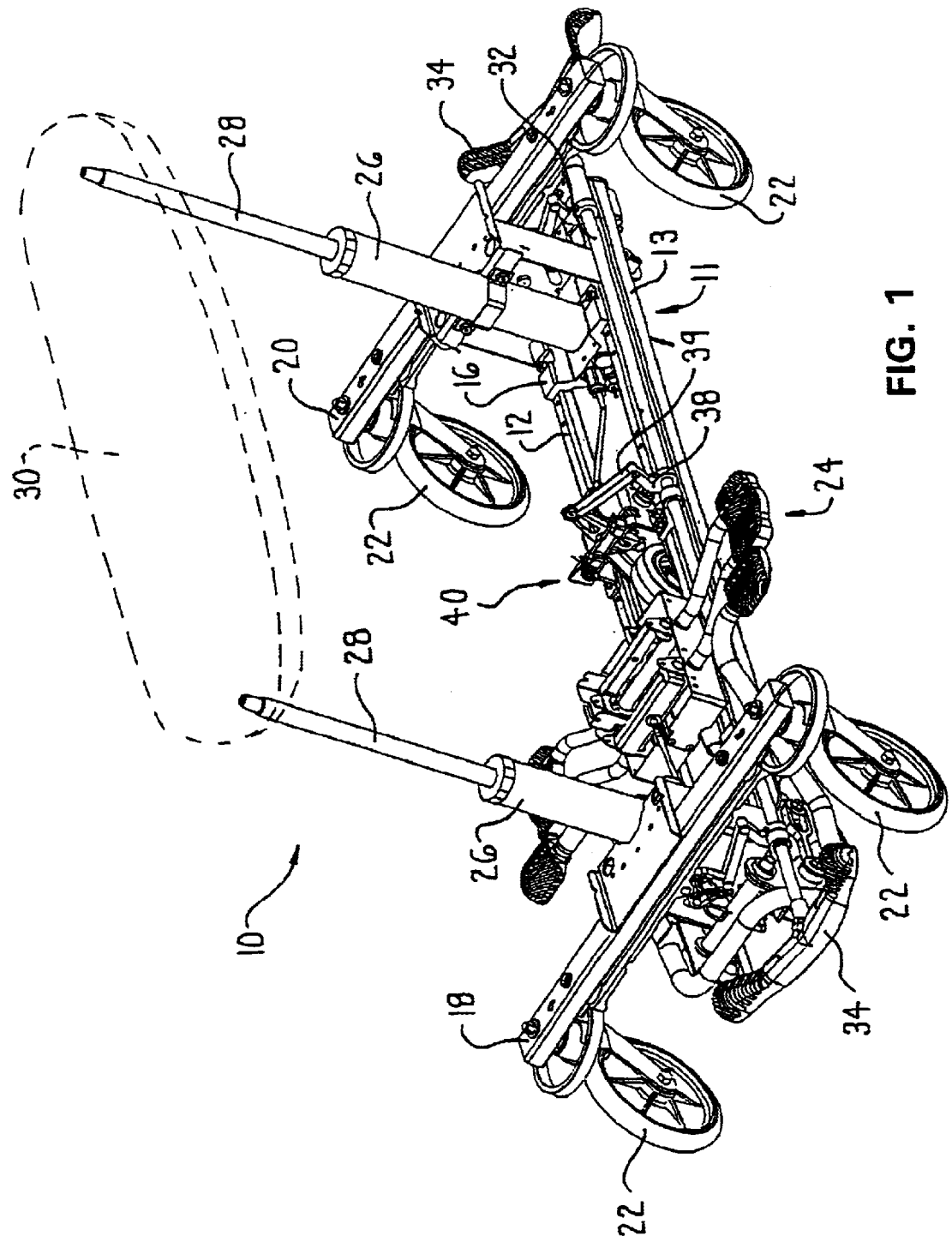
FIG. 1 is an isometric view of a wheeled carriage embodying the invention, the patient support deck being illustrated in broken lines.

Certain terminology will be used in the following description for convenience in reference only, and will not be limiting. The words "up", "down", "right" and "left" will designate directions in the drawings to which reference is made. The words "in" and "out" will refer to directions toward and away from, respectively, the geometric center of the device and designated parts thereof. Such terminology will include derivatives and words of similar importance.

FIG. 1 is an illustration of a wheeled carriage 10 for supporting a patient in a substantially horizontal position. The wheeled carriage 10 includes a frame or wheeled base 11 defined in part by a pair of laterally spaced elongate support bars 12, 13 that extend parallel to each other. The parallel support bars 12 and 13 are interconnected at a plurality of locations. For example, a manifold plate 16 extends between and is secured to the spaced parallel support bars 12 and 13. The wheeled base 11 includes transverse beams 18 and 20 at opposing ends thereof. Castered wheels 22 are secured at opposing ends of the beams 18 and 20. The wheeled carriage 10 includes a pedal arrangement 24 extending outwardly on opposing sides of the wheeled carriage. Spaced cylinder housings 26 receive piston rods 28 for raising and lowering a patient support deck 30. The wheeled carriage 10 includes a rotatable control shaft 32 rotatably mounted to the frame and extending the length thereof. Manipulative members, such as foot pedals 34, are secured at opposing ends of the control shaft 32.

A detailed discussion of the above identified elements and other unlabeled elements illustrated in FIG. 1 are disclosed in U.S. patent application Ser. No. 10/083,234 filed Feb. 26, 2002, the disclosure of which was previously incorporated by reference herein.

The control shaft 32 includes a bracket member 38 fixed thereto and rotatable therewith. A linkage is formed by the bracket member 38 and parallel linking elements 39 pivotably secured at an outward end thereof.

An auxiliary wheel assembly 40 mounted onto the support bars 12 and 13 defines Applicants' invention.

AUXILIARY WHEEL ASSEMBLY

Figure 2:
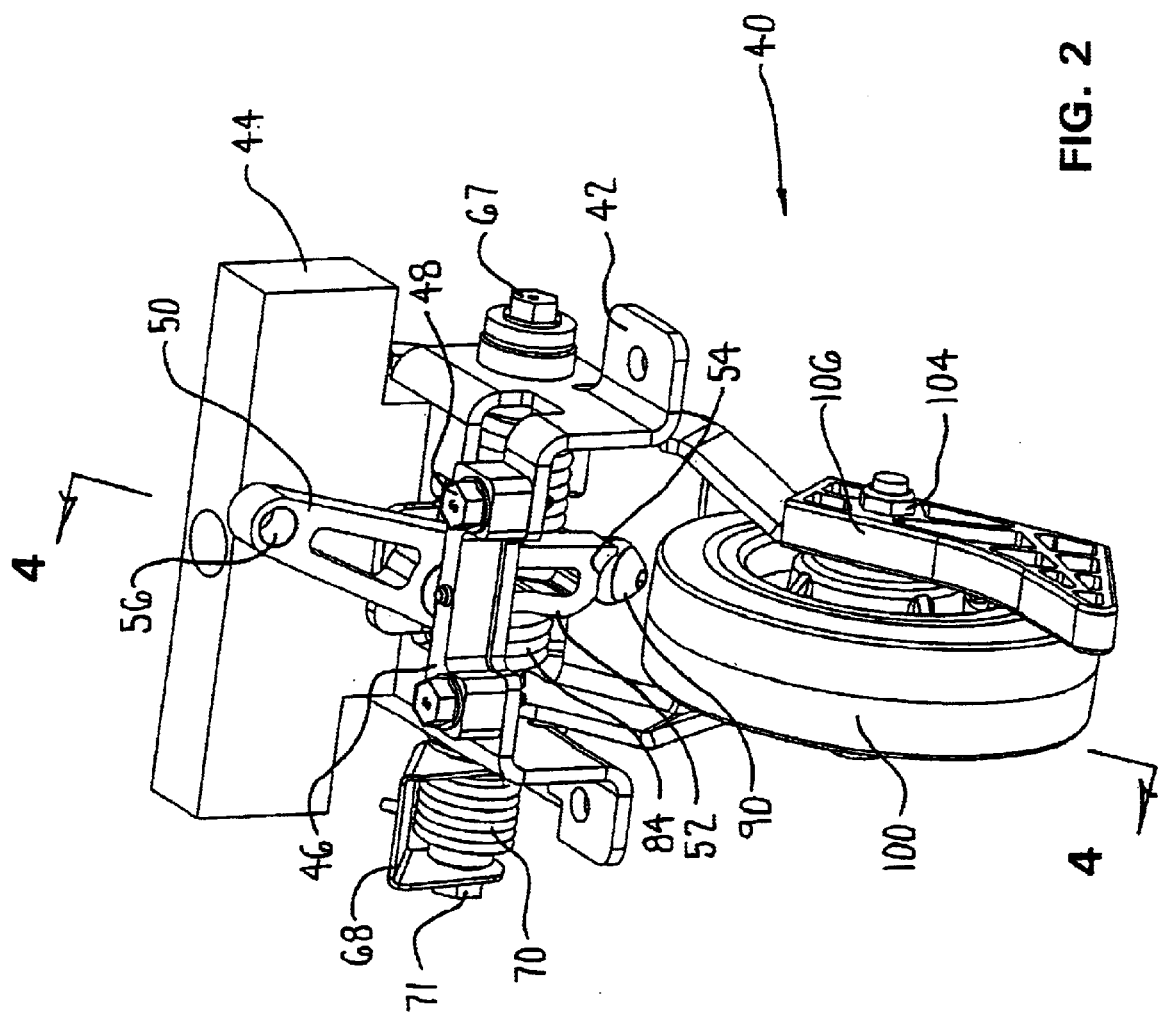
FIG. 2 is an isometric view of the auxiliary wheel assembly in the deployed position.

FIG. 2 illustrates the auxiliary wheel assembly 40 having an auxiliary wheel mounting bracket 42. As shown in FIG.

Figure 3:
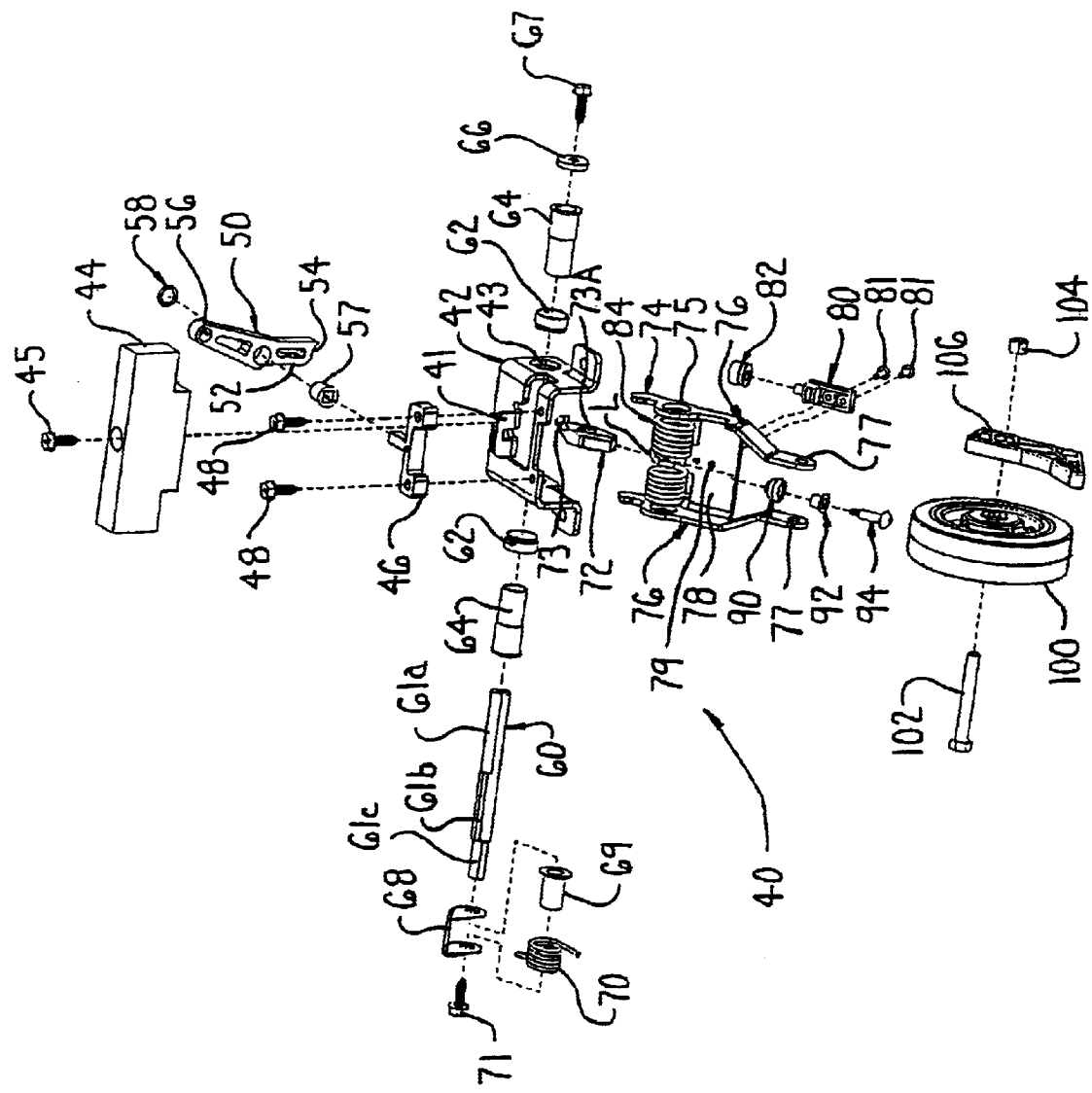
FIG. 3 is an exploded view illustrating the individual elements of the auxiliary wheel assembly.

3, the auxiliary wheel mounting bracket 42 includes aligned mounting bracket apertures 43. Spaced vertically opening bolt receiving holes are also provided for securing the auxiliary wheel mounting bracket 42 to the support bars 12 and 13 of the frame 11. As shown in FIG. 3, the auxiliary wheel mounting bracket 42 includes a cam mounting plate 41 projecting upwardly therefrom.

The auxiliary wheel assembly 40 includes a hood stand 44 secured to the top of the auxiliary wheel mounting bracket 42 by a hood stand mounting screw 45. A cam pivot block 46 spaced from the hood stand 44 is secured to the top of the auxiliary wheel mounting bracket 42 by screws 48. The cam pivot block 46 projects upwardly from the auxiliary wheel mounting bracket 42 and substantially parallel to the cam mounting plate 41.

A cam 50 is positioned at a central location between the cam mounting plate 41 and the cam pivot block 46. The cam 50 includes a cam surface 52 at a first side thereof oriented in a downward direction. The cam surface 52 includes a depression 54 at one end of the cam 50. The cam 50 includes a cam connecting hole 56 at the opposing end thereof. FIG. 3 shows a cam bearing 57 for positioning in a central aperture of the cam 50 and a wave spring 58. The cam bearing 57 mounts to a projection on the cam pivot block 46. The cam bearing 57 is received in the central aperture of the cam 50. The cam wave spring 58 is located between the cam 50 and the cam mounting plate 41. The cam wave spring 58 prevents or limits lateral movement of the cam 50 along the rotational axis thereof. Thus, the cam pivot block 46 and the cam mounting plate 41 pivotably support the cam 50.

FIG. 3 illustrates a support shaft 60 that extends through the mounting bracket apertures 43 of the auxiliary wheel mounting bracket 42. The support shaft 60 is divided into plural sections along the length thereof. The support shaft 60 has a first drive pin keyed section 61a, a second central section 61b with outwardly projecting flats on opposing sides and a third spring hook receiving keyed section 61c.

The support shaft 60 is positioned through bearing races 62 located on opposing outer sides of the auxiliary wheel mounting bracket 42. In FIG. 3, support shaft bearings 64 are shown on opposing sides of the auxiliary wheel mounting bracket 42 outwardly from the respective bearing races 62. The support shaft bearings 64 insert into the bearing races 62 and through the mounting bracket apertures 43. The support shaft 60 inserts into and through the support shaft bearings 64 and bearing races 62 so that one support shaft bearing 64 receives the central section 61b and the other support shaft bearing 64 receives the drive pin keyed section 61a. A thrust washer 66 is positioned at one end of the support shaft 60 and secured to the shaft by a shaft screw 67.

The opposing end of the support shaft 60 receives spaced arms of a spring hook 68 having apertures axially aligned with each other. A hollow spring mount 69 is positioned between the arms of the spring hook 68 and relatively rotatably receives therethrough the support shaft 60. The apertures in the spaced arms of the spring hook 68 have a pair of flat sides. The dimensions of the apertures match the outer surfaces of the spring hook receiving keyed section 61c. Thus spring hook 68 only rotates with the support shaft 60.

A wheel stowing torsion shaft spring 70 includes coils extending along a length and surrounding the hollow spring mount 69. End legs of the wheel stowing torsion shaft spring 70 project outwardly from and transverse to a longitudinal axis of the support shaft 60 positioned within the coils. The end legs are on opposing ends of the coils of the torsion spring 70. The end legs define an angle of greater than 90° when viewed in the longitudinal direction.

A shaft screw 71 mounts the spring hook 68, the hollow spring mount 69 and wheel stowing torsion shaft spring 70 to the support shaft 60. When the auxiliary wheel assembly 40 is secured to the frame 11, one end leg of the wheel stowing torsion shaft spring 70 contacts the spring hook 68 and the other end leg contacts the support bar 12. The wheel stowing torsion shaft spring 70 maintains the auxiliary wheel assembly 40 in the position shown in FIG. 5.

A drive pin 72 having a drive pin aperture 73A is received by the support shaft 60. The drive pin aperture 73A has flat opposing surfaces and dimensions that match the outer dimensions of the drive pin keyed section 61a of the torsion support shaft 60.

The drive pin keyed section 61a is received in the drive pin aperture 73A and the drive pin 72 is positioned on the support shaft 60 adjacent the central section 61b. The dimensions of the support shaft 60 and the drive pin aperture 73A result in fixed rotation of the drive pin 72 with the support shaft 60. A stop portion or stop element 73 of the drive pin 72 projects outwardly transverse from the longitudinal axis of the support shaft 60.

An auxiliary wheel support bracket 74 includes first and second auxiliary wheel support arms 76. The auxiliary wheel support arms 76 each have an auxiliary wheel support bracket aperture 75 axially aligned with each other at respective first ends and receiving the support shaft 60 therethrough. An integral auxiliary wheel support plate 78 extends across and between the two support arms 76. Auxiliary wheel support apertures 77 axially aligned with each other are located at a second lower end of the support arms 76. As shown in FIG. 3, the support plate 78 of the auxiliary wheel support bracket 74 includes spaced support plate apertures 79.

A stop mounting pin 80 is secured to the auxiliary wheel support plate 78 by stop mounting pin screws or rivets 81 received into the spaced support plate apertures 79. A rubber stop member 82 is mounted to one end of the stop mounting pin 80.

An auxiliary wheel torsion support spring 84 is formed with coils extending along a length. The coils receive the support shaft 60 therein. End legs of the coils project outwardly and parallel in the same direction. The auxiliary wheel torsion support spring 84 has an open central area with a loop L connecting two spaced groups of coils. The groups of coils are aligned to have a common axis. The auxiliary wheel torsion support spring 84 is symmetric with respect to a plane that is transverse to the common axis and cuts through a center of the loop L.

As shown in FIG. 2, the auxiliary wheel torsion support spring 84 is positioned between the auxiliary wheel support arms 76, which are positioned within the auxiliary wheel mounting bracket 42. The drive pin 72 is positioned in the open central area between the spaced coils of the auxiliary wheel torsion support spring 84 when the auxiliary wheel assembly 40 is assembled.

Figure 5:
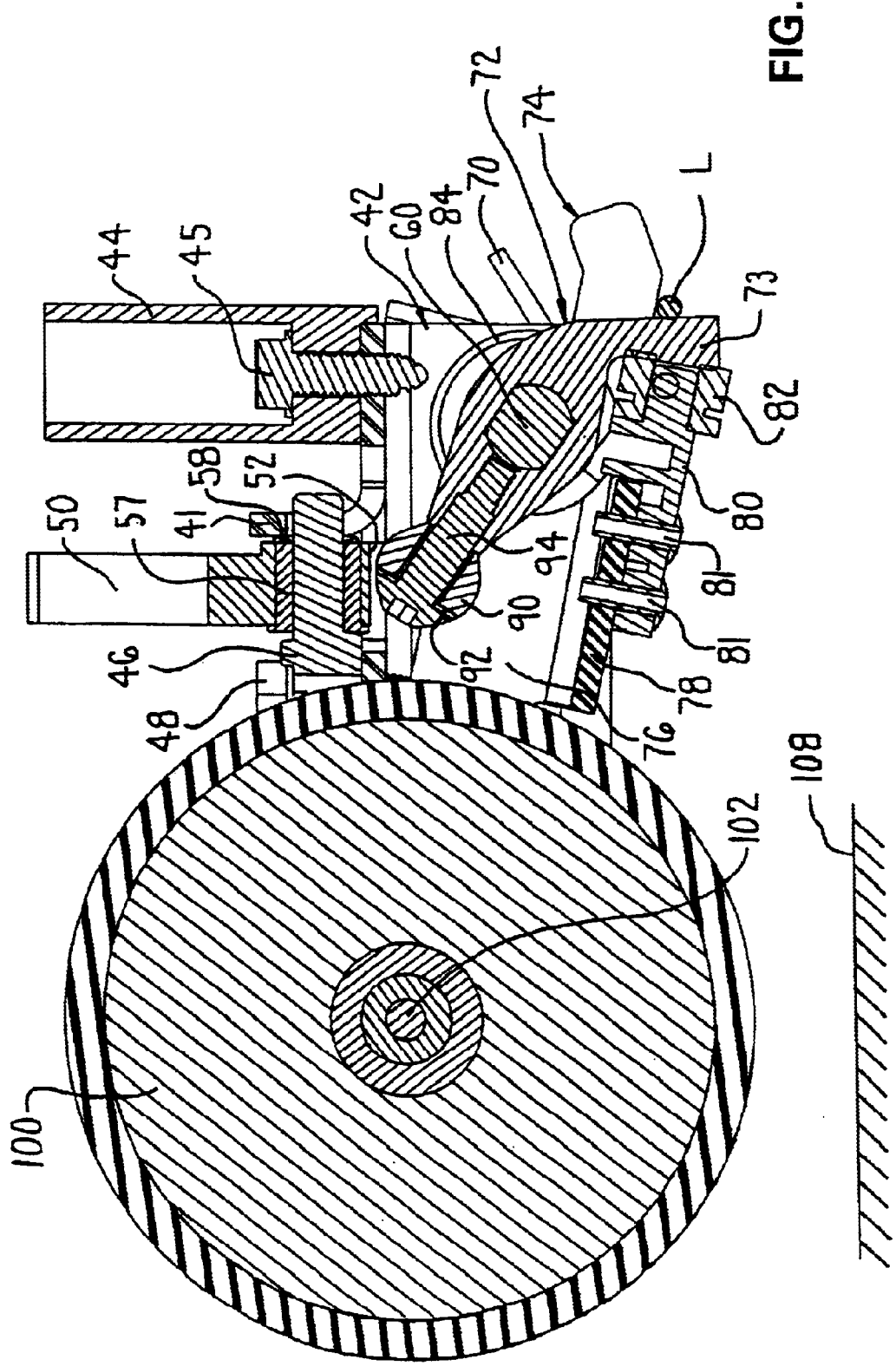
FIG. 5 is a cross sectional view identical to the view shown in FIG. 4, except the auxiliary wheel is in the stowed position and the wheeled carriage is in the brake position.

The auxiliary wheel torsion support spring 84 is pretensioned during assembly. The end legs of the auxiliary wheel torsion support spring 84 apply a force to the auxiliary wheel support plate 78 to rotate the auxiliary wheel support bracket 74 downwardly and rearwardly about the axis of the support shaft 60. The loop L of the auxiliary wheel support spring 84 contacts against a rear part of the stop element 73 of the stop mounting pin 80. Due to the pretensioning of the torsion support spring 84, the loop L is in contact with and thus effectively fixed to the stop element 73. The stop mounting pin 80 rotates with the auxiliary wheel support bracket 74 and contacts the stop element 73 of the drive pin 72 which is fixed to the support shaft 60. The result is shown in FIG. 5, which illustrates the rubber stop member 82 contacting the stop element 73 of the drive pin 72. In this manner, the auxiliary wheel torsion support spring 84 resists any separation of the rubber stop member 82 from the stop element 73. Thus, the auxiliary wheel torsion support spring 84 effectively connects between the auxiliary wheel support bracket 74 which is pivotable about the support shaft 60 and the drive pin 72 which is fixedly secured to the rotatable support shaft 60.

A cam follower 90 is supported at an opposing end of the drive pin 72. The cam follower 90 has an opening that receives a roller insert 92 and a roller screw 94. The roller screw 94 connects to the drive pin 72. The cam follower 90 projects outwardly from the drive pin 72 in a direction transverse to the longitudinal axis of the support shaft 60.

The auxiliary wheel 100 is mounted at a center thereof to the auxiliary wheel support bracket 74 at the auxiliary wheel support apertures 77 formed at the lower end of the auxiliary wheel support arms 76 by an auxiliary wheel mounting bolt 102 and an auxiliary wheel mounting nut 104. The auxiliary wheel support arms 76 prevent movement of the plane of rotation of the auxiliary wheel 100 out of axial alignment with the length of the patient support deck 30.

As shown in FIG. 2, a bumper 106 is also mounted to the auxiliary wheel support bracket 74 by the auxiliary wheel mounting bolt 102 and the auxiliary wheel mounting nut 104. The bumper 106 is positioned adjacent to the auxiliary wheel 100 and projects forwardly beyond the front part of the auxiliary wheel.

The auxiliary wheel support bracket 74 and the auxiliary wheel mounting bracket 42 are generally symmetric about the plane of rotation of the auxiliary wheel 100.

OPERATION OF AUXILIARY WHEEL ASSEMBLY

The foot pedals 34 at opposing ends of the wheeled carriage 10 are utilized to rotate the control shaft 32 between a brake position, a neutral position and a wheel deployed position for the auxiliary wheel 100.

In the brake and neutral positions, the auxiliary wheel 100 does not contact the floor surface 108.

OPERATION OF SUPPORT SHAFT

Figure 4:
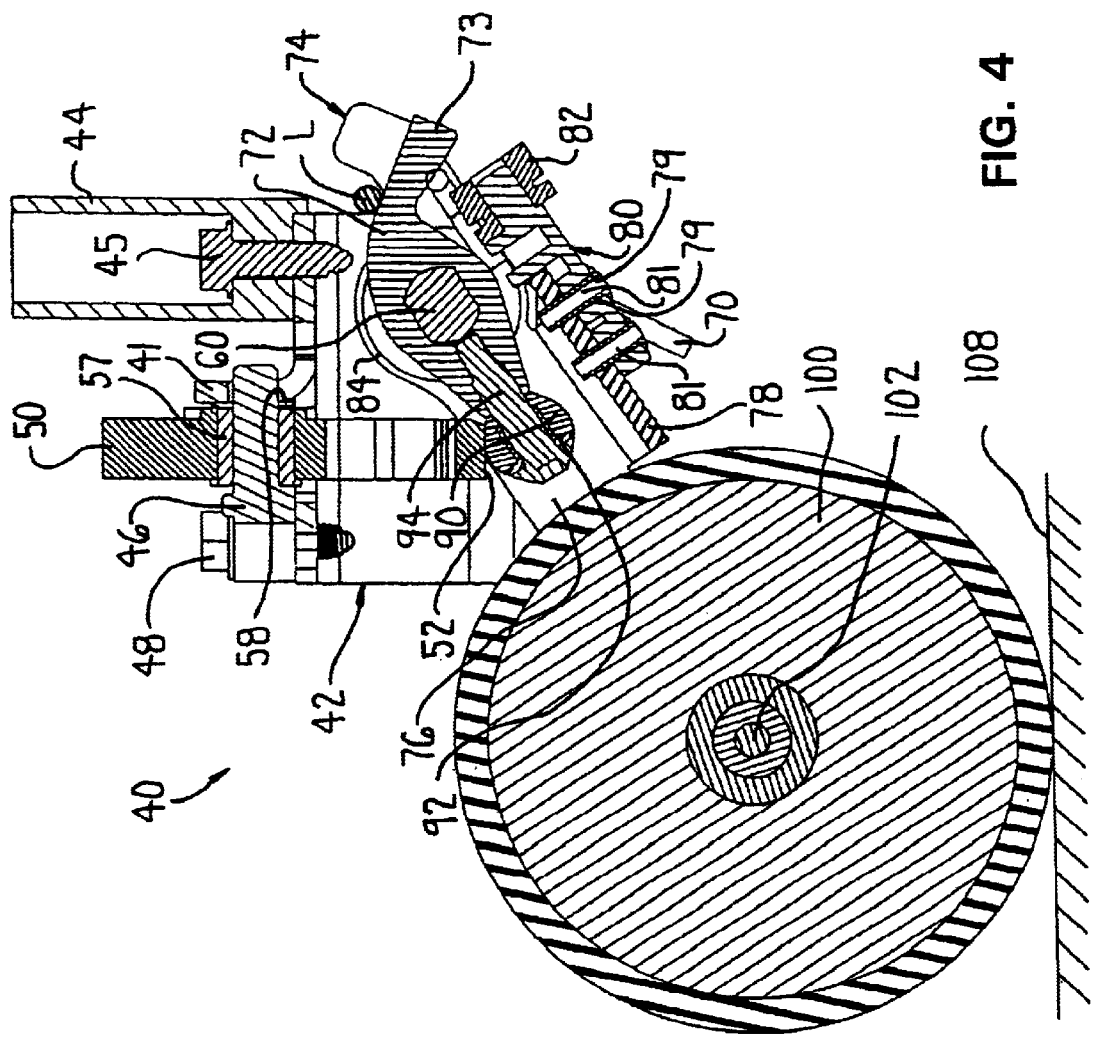
FIG. 4 is a cross sectional view taken along the line 4—4 in FIG. 2 and illustrating the auxiliary wheel in the deployed position.

FIGS. 1, 2 and 4 illustrate the auxiliary wheel in the deployed position. FIG. 5 shows the auxiliary wheel 100 in the stowed position.

STOWED POSITION

As discussed above, when the auxiliary wheel assembly 40 is mounted onto the support bars 12, 13 of the wheeled carriage 10, one outwardly projecting end leg of the wheel stowing torsion shaft spring 70 contacts the corresponding support bar 12 and the other end leg of the wheel stowing torsion shaft spring 70 rests against the spring hook 68. The spring hook 68 is arranged to rotate with the support shaft 60.

The end leg of the wheel stowing torsion shaft spring 70 contacting the support bar 12 cannot move. The end leg contacting the spring hook 68 can rotate with the spring hook 68 and the support shaft 60. The wheel stowing torsion shaft spring 70 is pretensioned, if necessary, to maintain the support shaft 60 at a rotative position shown in FIG. 5 where the auxiliary wheel 100 is spaced above a floor surface 108.

As shown in FIG. 5, when the auxiliary wheel 100 is in the stowed position, the cam 50 is positioned in a substantially horizontal position whereat the cam follower 90 contacts the cam surface 52 at a position spaced away from and significantly inwardly from the depression 54 at the end of the cam.

DEPLOYED POSITION

To deploy the auxiliary wheel 100, an operator presses the foot pedal 34 to rotate the control shaft 32 in a direction causing the shaft bracket member 38 and the parallel linking elements 39 rotatably secured by a bolt or screw at the cam connecting hole 56 of the cam 50 to pivot the cam about its pivot axis to the substantially vertical position illustrated in Applicants' FIGS. 1, 2 and 4. By pivoting the cam 50 against the force of the torsion shaft spring 70, the operator moves the cam follower 90 downwardly until the cam follower locks into the depression 54 of the cam. The distance the cam follower 90 rotates about the support shaft 60 through the drive pin 72, relates to a distance that the auxiliary wheel support bracket 74 rotates the auxiliary wheel 100 to contact the floor surface 108.

OPERATION OF AUXILIARY WHEEL SUPPORT BRACKET AND SUPPORT SPRING

When the auxiliary wheel 100 is in the stowed position, the rubber stop member 82 fixedly secured to the auxiliary wheel support plate 78 contacts the stop element 73, which is a part of the drive pin 72. In this manner, the pretensioned force applied by the auxiliary wheel support spring 84. cannot rotate the auxiliary wheel support bracket 74 beyond the position shown in FIG. 5. Thus the auxiliary wheel torsion support spring 84 continuously applies a rotative force to the auxiliary wheel support bracket 74 in a rearward direction.

When deployed as discussed above, the auxiliary wheel contacts the floor surface 108. The auxiliary wheel 100 is actually deployed toward a position extending beyond a level floor surface, which would raise a pair of castered wheels 22 of the wheeled carriage 10 in a similar manner to the invention set forth in U.S. Pat. No. 6,256,812. However, the mass of the wheeled carriage 10 against the rigid floor provides an upwardly directed force against the pretensioned force of the auxiliary wheel torsion support spring 84 and overcomes the spring force to pivot the auxiliary wheel 100 and the corresponding auxiliary wheel support bracket 74 about the support shaft 60, which does not rotate. The pivoting of the auxiliary wheel support bracket 74 results in the rubber stop member 82 separating from the stop element 73, as shown in FIG. 4, and the castered wheels 22 remaining in contact with the floor surface 108.

From this deployed auxiliary wheel position, when an uneven floor at a central location beneath the auxiliary wheel 100 of the wheeled carriage 10 becomes higher than a plane defined by the point of contact of the castered wheels 22 contacting a level floor surface, the auxiliary wheel support bracket 74 pivots forwardly and upwardly about the axis of the support shaft 60 to move the auxiliary wheel 100 upwardly, which increases the gap between the rubber stop member 82 and the stop element 73. This pivoting enables both the auxiliary wheel 100 and the castered wheels 22 to continue to maintain contact with the floor surface 108.

Likewise, if the floor surface 108 below the auxiliary wheel 100 is lower than the plane defined by the point of contact of the castered wheels 22 with a level floor surface, the auxiliary wheel torsion support spring 84 continues to maintain contact between the auxiliary wheel 100 and the lowered floor surface 108 by causing downward and rearward pivoting movement of the auxiliary wheel. The movement closes part of the gap between the rubber stop member 82 and the stop element 73. Therefore, for example, if the wheeled carriage 10 begins travel from a flat floor surface onto an upwardly inclined ramp, the auxiliary wheel 100 maintains contact and traction with the floor surface 108.

Since the foot pedals 34 have three positions as discussed above, there is a neutral position between the brake position shown in FIG. 5 and the deployed position shown in FIG. 4. This neutral position corresponds to the cam follower 90 contacting the cam 50 at a position on the cam surface 52 between the depression 54 and a position close to the pivot axis of the cam 50. At the neutral position, the auxiliary wheel 100 is positioned lower than in the brake position illustrated in FIG. 5. However, the auxiliary wheel 100 still remains a sufficient distance from the floor surface 108 to avoid contact therewith.

Other embodiments of the invention are also contemplated. For example, while a cam apparatus is preferred, a different linkage arrangement may be provided to rotate the support shaft 60 between the deployed position and the stowed position.

In the brake position shown in FIG. 5, the cam follower 90 does not appear to be in contact with the cam surface 52 of the cam 50. However, in most embodiments, a portion of the cam 50 continuously contacts at least a side of the cam follower 90.

If so desired, in some embodiments a power drive motor assembly may be secured to the auxiliary wheel support bracket 74 to enable powered driving of the auxiliary wheel 100. Such a motor assembly pivots with the support bracket 74.

As shown in FIG. 1, the auxiliary wheel assembly 40 can be mounted to the wheeled carriage 10 by utilizing two bolts and a single connection of the cam 50 to a linkage member. This arrangement enables quick and easy replacement of the entire auxiliary wheel assembly 40.

While the wheel stowing torsion shaft spring 70 and the auxiliary wheel torsion support spring 84 are torsion springs, in some embodiments other types of less preferred resilient members may also be utilized. For example, the wheel stowing torsion shaft spring 70 may comprise a tension spring projecting linearly in a vertical direction and connected to a swivel joint on the support shaft 60.

While the deployment apparatus utilizes a control shaft 32 and foot pedals 34 to manually operate the cam apparatus, other arrangements are contemplated. For example, an electric powered motor can be controlled to pivot the cam 50 between the deployed and stowed positions.

While a single auxiliary wheel 100 is illustrated, multiple auxiliary wheels are contemplated. While four castered wheels 22 are shown, a greater or lesser number are also contemplated.

The auxiliary wheel 100 is aligned along a central axis of the wheeled carriage 10 such that the auxiliary wheel is equidistant from a pair of the castered wheels 22 spaced from each other at one end of the wheeled carriage 10. However, other mounting locations on the wheeled base 11 are contemplated.

In some embodiments, the control pedals 34 shown on ends of the wheeled carriage 10 may also be located on the sides of the wheeled carriage to control the position of the auxiliary wheel 100.

While screws, bolts and rivets are disclosed, other types of fasteners or connectors may be utilized.

While elements, such as the cam pivot block 46 are integrally fixed to another element, alternatively such elements may be monolithic.

Although particular preferred embodiments of the invention have been discussed in detail for illustrative purposes, it will be recognized that variations or modifications of the disclosed apparatus, including the rearrangement of parts, lie within the scope of th present invention.

We claim:

1. A wheeled carriage for supporting a patient in a substantially horizontal position, comprising:

a patient support having a length, opposing ends of the length comprising a head end and a foot end of said patient support, said patient support having a pair of lateral sides intermediate the head and foot ends;

a wheeled base having a length and supporting said patient support and enabling movement of said patient support, said wheeled base including at least four floor surface engaging and castered wheels spaced from one another;

an auxiliary wheel assembly secured to said wheeled base and including a rotatable support shaft with an axis transverse to the length of said wheeled base and a stop element mounted to said rotatable support shaft, said auxiliary wheel assembly further including:

an auxiliary wheel support bracket having a first end rotatably secured to said support shaft to enable free rotation about the axis of said support shaft, said auxiliary wheel support bracket having a stop thereon;

an auxiliary wheel support spring for continually urging said auxiliary wheel support bracket in a first direction about the axis of said support shaft and said stop into engagement with said stop element;

at least one auxiliary wheel rotatably secured to a second end of said auxiliary wheel support bracket; and a deployment apparatus for rotating said support shaft and said stop element in the first direction about its axis to move said auxiliary wheel between a stowed position spaced from a floor surface and a deployed position engaging the floor;

wherein in the deployed position said auxiliary wheel contacts the floor surface and the mass of said wheeled carriage is applied against said auxiliary wheel support spring to separate said stop from said stop element and pivot said auxiliary wheel support bracket about the axis of said support shaft so that each of said castered wheels and said at least one auxiliary wheel maintain contact with the floor surface.

2. The wheeled carriage according to claim 1, wherein said auxiliary wheel assembly includes a wheel stowing spring applying a rotational force to said support shaft for maintaining said auxiliary wheel at the stowed position away from the floor surface, said stop of said auxiliary wheel support bracket contacting said stop element secured to said support shaft when said auxiliary wheel is in the stowed position.

3. The wheeled carriage according to claim 2, wherein said wheel stowing spring comprises a torsion spring located about an end of said support shaft.

4. The wheeled carriage according to claim 1, wherein said deployment apparatus comprises:

a control shaft rotatably secured to said wheeled base and extending the length thereof;

at least one manipulative member secured to at least one end of said control shaft; and a linkage secured to said control shaft.

5. The wheeled carriage according to claim 4, wherein said deployment apparatus comprises a cam apparatus secured to said auxiliary wheel assembly and joined to said linkage.

6. The wheeled carriage according to claim 5, wherein said cam apparatus includes a cam follower fixedly secured relative to said auxiliary wheel support shaft, whereby operation of said manipulative member controls said cam apparatus to move said cam follower and pivot said support shaft about its axis so that said auxiliary wheel moves into contact with the floor surface.

7. The wheeled carriage according to claim 6, wherein said cam apparatus additionally includes:

a cam pivot block secured to said auxiliary wheel assembly; and a cam member pivotably secured to said cam pivot block and having a first end secured to said linkage with a second opposing end and a portion of a side defining a cam surface, wherein operation of said manipulative member rotates said control shaft, which moves said linkage to pivot said cam member so that said cam follower advances along the cam surface to pivot said support shaft against the force of a wheel stowing spring maintaining said auxiliary wheel in the deployed position, the cam surface including a depression at the end of said cam member shaped to receive said cam follower therein and lock the rotation position of said support shaft with said auxiliary wheel contacting the floor surface.

8. The wheeled carriage according to claim 5, wherein said auxiliary wheel assembly includes a wheel stowing spring for applying a rotational force to said support shaft for maintaining said auxiliary wheel at the stowed position away from the floor surface, said stop of said auxiliary wheel support bracket contacting said stop element when said auxiliary wheel is in the stowed position.

9. The wheeled carriage according to claim 1, wherein in the deployed position said auxiliary wheel support spring is configured to maintain said auxiliary wheel and each of said castered wheels in contact with the floor surface as the wheeled carriage advances along an uneven floor surface.

10. The wheeled carriage according to claim 1, wherein said auxiliary wheel support spring is configured as a torsion spring secured to said auxiliary wheel bracket.

11. The wheeled carriage according to claim 10, wherein coils of said auxiliary wheel support spring are positioned about said rotatable support shaft to provide a compact arrangement.

12. The wheeled carriage according to claim 1, wherein said auxiliary wheel support bracket includes a bumper secured thereto to assist said auxiliary wheel moving over raised objects on the floor surface.

13. The wheeled carriage according to claim 1, wherein said stop of said auxiliary wheel support bracket for contacting said stop element comprises a stop mounting pin secured to said auxiliary wheel support bracket and a rubber stop member at an end thereof to dampen contact between said stop and said stop element when said auxiliary wheel moves to the stowed position from the deployed position.

14. The wheeled carriage of claim 1, wherein said at least one auxiliary wheel has a plane of rotation that is oriented in axial alignment with the length of said patient support, said auxiliary wheel support bracket preventing movement of the plane of rotation of said auxiliary wheel out of axial alignment with the length of said patient support.

15. A wheeled carriage for supporting a patient in a substantially horizontal position, comprising:

a patient support having a length, opposing ends of the length comprising a: head end and a foot end of said patient support, said patient support having a pair of lateral sides intermediate the head and foot ends;

a wheeled base having a length and supporting said patient support and enabling movement of said patient support, said wheeled base including at least four floor surface engaging and castered wheels spaced from one another;

an auxiliary wheel assembly secured to said wheeled base and including a rotatable support shaft with an axis and a stop element mounted to said rotatable support shaft, said auxiliary wheel assembly further including:

an auxiliary wheel support bracket having a first end rotatably secured to said support shaft to enable rotation about the axis of said support shaft, said auxiliary wheel support bracket having a stop thereon;

an auxiliary wheel support spring for continually urging said auxiliary wheel support bracket in a first direction about the axis of said support shaft and said stop into engagement with said stop element;

at least one auxiliary wheel rotatably secured to a second end of said auxiliary wheel support bracket;

a shaft spring secured at an end of said rotatable support shaft for continually urging said rotatable support shaft to a position whereat said auxiliary wheel is spaced from a floor surface; and a deployment apparatus for rotating said rotatable support shaft and said stop element in said first direction about its axis against said shaft spring to move said auxiliary wheel between a stowed position spaced from the floor surface and a deployed position engaging the floor surface;

whereby in the deployed position, when said auxiliary wheel contacts the floor surface, said auxiliary wheel and said auxiliary wheel support bracket pivot about the axis of said support shaft so that said stop and stop element separate and each of said castered wheels and said at least one auxiliary wheel maintain contact with the floor surface.

16. The wheeled carriage according to claim 15, wherein said auxiliary:wheel support bracket is substantially horizontal when said auxiliary wheel is in the stowed position.

17. The wheeled carriage according to claim 15, wherein said auxiliary wheel support spring comprises a force applying torsion spring secured to said auxiliary wheel support bracket and including coils receiving said rotatable support shaft therein.

18. The wheeled carriage according to claim 15, wherein said shaft spring comprises a force applying torsion spring secured between said auxiliary wheel assembly and said wheeled base.

19. The wheeled carriage according to claim 15, wherein said deployment apparatus comprises:

a control shaft rotatably secured to said wheeled base and extending the length thereof;

at least one manipulative member secured to at least one end of said control shaft;

a linkage secured to said control shaft.

a cam pivot block secured to said auxiliary wheel assembly;

a cam member pivotably secured to said cam pivot block and having a first end secured to said linkage and a second end and a portion of a side having a cam surface; and a cam follower fixedly secured to an opposing end of said stop element which is secured to said support shaft, whereby operation of said manipulative member controls said linkage to pivot said cam member, said cam member moving said cam follower to rotate said support shaft about its axis in opposition to said shaft spring so that said auxiliary wheel moves downwardly and into contact with the floor surface.

* * * * *